US010514186B2

(12) United States Patent
Leberer (10) Patent No.: US 10,514,186 B2
(45) Date of Patent: Dec. 24, 2019

(54) SOLAR COLLECTOR ASSEMBLY (71) Applicant: INNOVATIVE MOTION GMBH, Berlin (DE)

(72) Inventor: Thomas Leberer, Berlin (DE)

(73) Assignee: INNOVATIVE MOTION GMBH, Berlin (DE)

( * ) Notice: Subject to any disclaimer, the term of this patent is extended or adjusted under 35 U.S.C. 154(b) by 679 days.

(21) Appl. No.: 14/903,656

(22) PCT Filed: Jul. 8, 2014

(86) PCT No.: PCT/EP2014/064556
§ 371 (c)(1),
(2) Date: Jan. 8, 2016

(87) PCT Pub. No.: WO2015/004113
PCT Pub. Date: Jan. 15, 2015

(65) Prior Publication Data
US 2016/0169560 A1 Jun. 16, 2016

(30) Foreign Application Priority Data

Jul. 10, 2013 (DE) .................. 10 2013 011 780
Nov. 15, 2013 (DE) .................. 10 2013 112 607

(51) Int. Cl.
*F24S 50/20* (2018.01)
*F24S 40/42* (2018.01)
(Continued)

(52) U.S. Cl.
CPC ............... *F24S 50/20* (2018.05); *F24S 20/20* (2018.05); *F24S 23/74* (2018.05); *F24S 30/425* (2018.05);
(Continued)

(58) Field of Classification Search
CPC .......... F24J 2002/5482; F24J 2/07; F24J 2/14; F24J 2/38; F24J 2/402; F24J 2/4618;
(Continued)

(56) References Cited

U.S. PATENT DOCUMENTS 2,205,378 A * 6/1940 Abbot .................. F24S 50/00
126/601
4,108,154 A 8/1978 Nelson
(Continued)

FOREIGN PATENT DOCUMENTS

DE 26 35 436 A1 3/1977
DE 20 2007 003 078 U1 8/2007
(Continued)

OTHER PUBLICATIONS

Cooper Bearings; "Fans and Blowers"; Apr. 14, 2012; https://www.cooperbearings.com/application.asp?appId=fans-blowers.*

*Primary Examiner* — Kenneth Rinehart
*Assistant Examiner* — Logan P Jones
(74) *Attorney, Agent, or Firm* — Lazaris IP (57) ABSTRACT

A solar collector assembly (10) comprising a pipe (18) exposed to solar energy adapted to accommodate a fluid flow in such a way that the solar energy is transferred to the fluid, a heat pipe or any other energy guiding system or absorber; a reflector assembly (12) with a curved reflector (14) for focusing solar radiation in the range of the pipe (18), and an actuator (90,64, 80) for moving the reflector assembly (12) in a way that the solar radiation is reflected in the direction of the pipe (12), is characterized in that means (30, 32) are provided for releasably fixing the reflector assembly (12) to the pipe (18), and the actuator (90, 64, 80) is fixed at the reflector assembly (12) or in the reflector assembly (12).

11 Claims, 4 Drawing Sheets

(51) Int. Cl.
  *F24S 30/425* (2018.01)
  *F24S 20/20* (2018.01)
  *F24S 40/57* (2018.01)
  *F24S 40/50* (2018.01)
  *F24S 80/30* (2018.01)
  *F24S 40/52* (2018.01)
  *F24S 23/74* (2018.01)
  *F24S 50/40* (2018.01)
  *F24S 30/00* (2018.01)

(52) U.S. Cl.
  CPC .............. *F24S 40/42* (2018.05); *F24S 40/50* (2018.05); *F24S 40/52* (2018.05); *F24S 40/57* (2018.05); *F24S 50/40* (2018.05); *F24S 80/30* (2018.05); *F24S 2030/15* (2018.05); *Y02E 10/41* (2013.01); *Y02E 10/45* (2013.01); *Y02E 10/47* (2013.01)

(58) Field of Classification Search
  CPC ........ F24J 2/4621; F24J 2/4623; F24J 2/4629; F24J 2/4647; F24J 2/541; F24S 50/20; F24S 50/40; Y02E 10/41; Y02E 10/45; Y02E 10/47
  See application file for complete search history.

(56) References Cited

U.S. PATENT DOCUMENTS

| | | | | |
|---|---|---|---|---|
| 4,345,587 A * | 8/1982 | Carvalho | ................ | F24S 25/61 126/662 |
| 4,427,838 A | 1/1984 | Goldman | | |
| 2006/0118104 A1 * | 6/2006 | Hon | ................ | F24S 30/455 126/571 |
| 2008/0308094 A1 * | 12/2008 | Johnston | ................ | F24S 25/00 126/694 |
| 2009/0314283 A1 | 12/2009 | Kimura et al. | | |
| 2010/0300431 A1 * | 12/2010 | Carrascosa Perez | ... | F24S 10/45 126/652 |
| 2010/0326424 A1 * | 12/2010 | Bennett | ................ | B64D 27/24 126/600 |
| 2011/0073104 A1 * | 3/2011 | Dopp | ................ | F24S 25/00 126/651 |
| 2011/0108092 A1 * | 5/2011 | Le Lievre | ........... | H01L 31/0547 136/246 |
| 2011/0132434 A1 * | 6/2011 | Correia | ............... | H01L 31/0521 136/248 |
| 2011/0180057 A1 * | 7/2011 | Page | ................ | F24S 23/81 126/600 |
| 2011/0282498 A1 * | 11/2011 | Freudenberger | ...... | F24D 11/003 700/282 |
| 2011/0297141 A1 * | 12/2011 | Correia | ................ | H02S 20/32 126/572 |
| 2012/0017887 A1 * | 1/2012 | Ahnert | ................ | F24J 2/07 126/652 |
| 2012/0279485 A1 * | 11/2012 | Koningstein | ............... | F24J 2/38 126/573 |
| 2013/0056000 A1 * | 3/2013 | Perrin | ................ | F24S 40/80 126/606 |
| 2013/0276868 A1 * | 10/2013 | Huemer | ................ | H01L 31/058 136/248 |
| 2014/0166069 A1 * | 6/2014 | Kirchner | ................ | F24J 2/38 136/246 |
| 2014/0201109 A1 * | 7/2014 | Tilley | ................ | G05F 1/67 705/412 |

FOREIGN PATENT DOCUMENTS

| | | | |
|---|---|---|---|
| DE | 20 2009 009 904 U1 | 1/2010 | |
| DE | 10 2011 107 135 A1 | 1/2013 | |
| DE | 10 2011 056 790 A1 | 6/2013 | |
| JP | 56155339 A * | 12/1981 | ................ F24J 3/02 |
| WO | WO 2007 146183 A2 | 12/2007 | |
| WO | WO 2009 146215 A2 | 12/2009 | |
| WO | WO 2010 142666 A2 | 12/2010 | |
| WO | WO 2011 141737 A2 | 11/2011 | |
| WO | WO 2012 025849 A2 | 3/2012 | |
| WO | 2012128877 A2 | 9/2012 | |
| WO | WO 2012 128877 A2 | 9/2012 | |
| WO | WO 2013 028522 A2 | 2/2013 | |

* cited by examiner

SOLAR COLLECTOR ASSEMBLY

CROSS REFERENCE TO RELATED PATENT APPLICATIONS

This patent application is filed herewith for the U.S. National Stage under 35 U.S.C. § 371 and claims priority to PCT application PCT/EP2014/064556, with an international filing date of Jul. 8, 2014. The contents of this application are incorporated in their entirety herein.

STATEMENT REGARDING FEDERALLY-SPONSORED RESEARCH OR DEVELOPMENT

Not applicable.

TECHNICAL FIELD

The invention relates to a solar collector assembly comprising
(a) a pipe exposed to solar energy adapted to accommodate a fluid flow in such a way that the solar energy is transferred to the fluid, a heat pipe or any other energy guiding system or absorber;
(b) a reflector assembly with a curved reflector for focusing solar radiation in the range of the pipe, and
(c) an actuator for moving the reflector assembly in a way that the solar radiation is reflected in the direction of the pipe.

Furthermore, the invention relates to a method for operating such an assembly.

If the reflector used in the assembly has a parabolic cross-section the reflector has the effect of a cylinder lens. The solar radiation incident on the earth surface with practically parallel rays is focused in a line. Therefore, the reflector is moved according to the solar movement. A pipe is positioned in the focal line. A fluid such as, for example, water or oil, flows through the pipe. In such a way the incident solar energy is transferred to the fluid. The hot fluid is available for further use, i.e. for heating, the generation of electric energy or as energy for processes.

In order to make optimal use of the incident solar energy a precise shape of the reflector and a good movement following to the solar movement is important.

BACKGROUND OF THE INVENTION

DE 10 2011 056 790 A1 describes a parabola trough collector. Solar radiation is collected with such a collector and reflected towards an absorber pipe. A heat carrier medium circulates in the absorber pipe. The parabola troughs are provided with a carrier structure carrying mirror elements which are moved according to the solar movement. The parabola troughs are held on pylons. One of the respective pylons is provided with a belt drive thereby forming a driving pylon engaging at an end of the parabola trough. For maintaining the parabolic cross section over the entire length the reflector is pre-formed in such a way that the parabola is formed only after the impact of the twisting.

Known parabola trough collectors are relatively large. They require many efforts for installation. Furthermore, it is difficult to maintain a precise shape over the entire length of the parabola trough.

The working life time of known solar collectors is essentially determined by the environmental conditions which the collectors are exposed to. Overheating will excessively strain the components. Strong winds cause forces and vibrations which may damage mechanical components with the course of the time. Condensation of water vapor at the reflector or its cover will cause absorption or reflection of solar radiation and thereby reduce the usable energy.

US 2009/0314283 A1 discloses solar collectors where light is focused on a pipe by means of elongated mirrors. Furthermore, engines are provided to move the assembly after the solar position. The document discloses the movement of the assembly according to the position of the sun. Measures to protect the assembly from environmental impact are limited to a transparent cover and sealings in connections.

WO 2010/142666 A2 discloses solar collectors where light is focused on a pipe by means of reflectors. The pipe is held in holders which are arranged in periodic distances along the reflector. Furthermore, a movement is disclosed in accordance with the solar position.

WO 2013/028522 A3 discloses solar collectors where light is focused on a pipe with reflectors. The reflector sits in a frame which is rotatably mounted on pylons. An engine causes a movement. The pipe is fixed to the frame with fixings. The frame is rotated by means of the engine. Furthermore, sensors are disclosed for controlling the movement in addition to or instead of a stored algorithm.

WO 2012/128877 A2 discloses a large, open solar collector assembly arranged in a glass house. The reflectors as well as the pipes are suspended from a structure which is formed by the roof of the glass house or the like. A rotating connection is used for this purpose. The weight is held by the roof. The reflectors have several portions and are mounted at the point of use. For this purpose fixing elements and adjustable cables are provided. The positions of the reflectors suspended at cables can be adjusted by pulling the cables by means of a pulley.

WO 2011/141737 A2 describes a reflector assembly with an actuator. The reflector rotates about a focal axis with the pipe. The reflection assembly is rotatably held by a fixed frame through a bearing and the pipe is guided through a pin ring and a worm gear without having any contact thereto. It is a disadvantage of the assembly that the pipe must be opened at least once to insert the pin ring and the worm gear. An installation and pre-adjustment as a whole is not possible with this assembly.

WO 2007/146183 A2 discloses a closed reflector assembly where the reflector is arranged inside a housing with a track-shaped housing bottom. Supports are mounted at the track holding the pipe. The sun is tracked by the assembly with a belt at the track. The force is transmitted on the track or rotatably born end faces of the reflector assembly. In the same way WO 2009/146215 A2 and WO 2012/025849 A2 disclose assemblies where the sun is tracked by a reflector with a belt.

BRIEF SUMMARY OF THE INVENTION

It is an object of the invention, to provide a device of the above mentioned kind which is particularly economical and has a long life time with best possible functionality.

According to an aspect of the invention this object is achieved with an assembly of the above mentioned kind in that
(d) means are provided for releasably fixing the reflector assembly to the pipe, and
(e) the actuator is fixed at the reflector assembly or in the reflector assembly.

Thereby, the actuator, the control means and the power supply form a module which can be fully assembled by the manufacturer. The pipe or the absorber must not be opened or removed. At the point of use only a pipe with a fluid flow must be provided where the reflector assembly is mounted in one piece. The installation at the point of use only requires little expertise, is less faulty and can be carried out much quicker than the assembly of an installation with several components. Any kind of heat pipe or other energy containing medium can be used as a pipe. Preferably, the actuator is positioned with a gearing at one of the end faces of the reflector assembly.

Preferably, the means for fixing the reflector assembly to the pipe comprise:

(a) a first clamping element;

(b) a second clamping element for connecting with the first clamping element, wherein the reflector assembly is rotatably mounted.

The first clamping element may be provided with an integrated socket for the bearing.

In particular, the first and the second clamping element may have a semicircular cross section and each may have an annular groove for receiving a bearing element for rotatably mounting the reflector assembly about the pipe. The bearing elements are then shaped as half shell bearings which can be fixed to a closed energy transmitting system, such as a pipe. The reflector assembly is applied to the pipe with one of the clamping elements. The assembly is then screwed thereto with the other, complementing clamping element or releasably fixed in any other way, such as, for example, with latching devices or a bayonet coupling. All other functionalities are realized already at the components of the assembly whereby no further adjustments or installations are required.

With such an assembly the reflector assembly is rotatably mounted on the pipe by means of a slide bearing. Comparing to a ball bearing this has the advantage that practically no sand can enter the bearing surfaces of the slide bearing which is advantageous for solar collectors used in the desert. The at least two pipe bearing shells of the slide bearing surround the pipe and are torque proof connected thereto. Preferably, the slide bearings i.e. their bearing shells, are made of from ceramic material, from PTFE or another heat resistant material. PTFE is sufficiently heat resistant and suitable for absorber temperatures of 200° C. or even higher and provides little friction at the gliding PTFE/PTFE-surfaces of the slide bearing.

Preferably it is provided that means for releasably fixing the reflector assembly to the pipe are provided at each end of the reflector assembly, such means being connected by a shaft in such a way that the force exerted by the actuator on the reflector assembly is partly transferred to the other end of the reflector assembly by the shaft. With such a modification of the invention only one actuator is necessary. The transmission of the power, however, is not effected by the reflector but through an additional shaft. The shaft extends parallel to the pipe. In such a way an undesired distortion of the reflector is avoided.

The reflector assembly can operate fully independent. If solar cells are used for the energy supply of the actuator no further cables and connection works must be carried out. The solar cells can be chosen particularly small if a low voltage direct current engine and a gearing are used. The required power which the actuator normally does not have can be generated with a gearing with a suitable transmission ratio. The energy supply of the actuator and the control unit can be effected by an electro thermal converter within the solar collector. Preferably, a storage, such as, for example, an accumulator, is provided enabling the proper function of the actuator and the control unit even in darkness or with unfavorable weather conditions.

For the tracking a sun position sensor and/or a sun rising/sun dawning sensor and a control unit can be provided for controlling the actuator using the data of the sun position sensor.

Using the read sensor data the probable position of the sun is calculated and tracked. Thereby, the system is less sensitive regarding disturbance by other light sources. The determination of the time of the day and the day in the year is possible.

In a particularly preferred modification of the invention a temperature sensor is provided for sensing the temperature at each end of the reflector assembly. The temperature sensors can be fixed to the rotational bearings of the clamping elements. The inlet temperature at the inlet of the pipe and the outlet temperature at the outlet of the pipe is measured thereby. With such temperatures it can be determined if there is a risk of overheating. If this is the case the reflector can be moved from the focus. Thereby, less solar energy is reflected to the pipe where the temperature is decreased and overheating can be avoided. Alternatively or additionally, the fluid flow through the pipe can be increased or decreased in order to effect a temperature change. In a simpler modification of the invention a temperature sensor is provided only on the outlet side.

In a particularly advantageous modification of the invention provides (a) a converter provided at a first end of the reflector assembly the converter having a light source for converting temperature data of a temperature sensor a this end into an optical signal, (b) a detector provided at the opposite, second end of the reflector assembly for receiving such optical signal, and (c) a converter with a sender for transmitting the temperature data of the first and second temperature sensor to a control means.

With such a modification of the invention no cables and no connecting of electrical or other connections is necessary. The temperature signal is transmitted in the form of an optical signal. The optical transmission is wireless and effected through the air. Such a transmission path is insensitive. After converting to a suitable electric signal the temperature can be sent to the control unit via cable or wireless, for example by infrared signals or Bluetooth. The control unit can adjust the flow volume of the fluid in the pipe or activate the actuator of the reflector assembly.

In a particularly preferred embodiment of the invention the reflector assembly is provided with one or more reinforcements extending parallel and/or ribs lateral to the pipe. The ribs are curved in accordance with the profile line of the reflector. Such a reinforcing framework of stiff material, such as aluminum or the like, will improve the shape stability of the reflector. The longitudinal reinforcements can be formed by sectional strips with T-shaped or H-shaped cross sections. The T-shaped profiles are mounted to the reflector edges with the plane top surface of the T-shaped profile. The reflector keeps its shape due to the reinforcing frame during use and during transport, storage and installation.

Preferably, an acceleration sensor is provided at the reflector assembly. The acceleration sensor is exposed to the gravitational force. From the gravitational force caused by the movement of the reflector assembly the exact position can be calculated. The acceleration sensor can be onedimensional, two-dimensional or three-dimensional. Together with the date and the geographical position the result can be used for tracking the sun with the reflector assembly. Alternatively, a detector is provided.

In addition, from the signals of the acceleration sensor vibrations can be detected. Such vibrations occur, for example, with wind and can have high frequencies. The vibrations are not desired and affect the life time of the assembly. If vibrations are detected having frequencies and/or amplitudes exceeding a selected threshold the reflector assembly is moved by the actuator until the vibrations assume a minimum. In such a way the assembly is treated with care and the life time is increased.

Strong wind can exert large forces on the reflector assembly which may damage the installation. In order to avoid such damages the angular momentum required for a rotational movement of the reflector assembly is determined. This can be effected in such a way that the current required for the actuation of the motor is detected. If the angular momentum exceeds a threshold the "storm case" is assumed. The sun is then not tracked anymore by the reflector assembly but skewed into the wind. This is carried out in such a way that the reflector assembly is moved into the position where the movement requires the smallest angular momentum, i.e. where the smallest current is needed for the movement.

In addition wind breaker formations can be provided at the outside. Thereby, airfoil effects at the solar collector are avoided which may cause breakdowns or damages of the solar collector.

Preferably, it is provided that the reflector assembly surrounds a closed space with the reflector and a transparent cover and the space is provided with a diaphragm bordering to the outside, the diaphragm adapted to be permeable for nitrogen molecules, oxygen molecules and other small gas molecules and impermeable for water molecules.

The cover protects the reflector and the mechanical components of dirt and environmental effects. Additionally, the cover can be coated with an optical anti-reflex coating for solar radiation. Furthermore, a non-stick coating for dirt-repelling can be provided on the cover. One embodiment of the invention provides that the cover is a glass plate. In addition to protecting the reflector surface from dirt the closed space also forms a heat buffer enabling the leveling temperature variations.

It is a problem where water remains causes interfering condenser water due to temperature and pressure variations. It is expensive to apply a vacuum and pressure variations will cause leaks. The use of a waterproof diaphragm enables the pressure compensation with gases such as nitrogen and oxygen which are always comprised in the air. A hygroscopic material can be enclosed in the closed space for removing water remains. Since no further water can enter through the diaphragm a small amount of such material is sufficient to provide dry air which prevents condensation.

A valve diaphragm comprises, for example, a hygroscopic range at its inside surface which is transparent for air, while the remaining range of the valve diaphragm is hydrophobic which is transparent for air. The hygroscopic range can be provided in the form of a hygroscopic coating of the hydrophobic diaphragm material. Such a valve diaphragm enables a pressure compensation between the collector space and the environment due to its transparency for O2 and N2 on one side and the drying of the atmosphere inside the collector space. This, in turn, enables the use of thinner glass plates as a cover and prevents the formation of condenser water or ice, for example during a day/night cycle or during a summer/winter-temperature cycle.

For further prevention of dirt and damages due to the weather it is provided that the assembly is tilted downwards during the night, i.e. that the reflector is positioned above the pipe with its outside. Rain, particles, leaves and the like from above will then not hit the light inlet side but the insensitive outside of the assembly.

A method for operating an assembly according to the present invention, comprising the steps of:
    (a) determining the position of the sun;
    (b) adjusting the reflector assembly; and
    (c) flowing a fluid through the pipe for absorption of solar heat;
provides that
    (d) the temperature in the range of the pipe is determined; and
    (e) the reflector assembly is adjusted in such a way that the determined temperature is lower than a selected threshold.

Furthermore, it can be provided that
    (d) the reflector assembly is moved,
    (e) the inertia of the reflector assembly is determined during such movement, and
    (f) the reflector assembly is moved into a position where the forces acting on the reflector assembly are a minimum if the inertia exceeds a selected threshold.

The assembly can be used in large numbers with solar collectors assembled with a fluid flow in series or parallel.

A preferred method for operating an assembly according to the present invention, as described above comprises the steps of:
    (a) determining the position of the sun;
    (b) adjusting the reflector assembly; and
    (c) flowing a fluid through the pipe for absorption of solar heat.

The method is characterized in that
    (d) the temperature in the range of the pipe is determined; and
    (e) the reflector assembly is adjusted in such a way that the determined temperature is lower than a selected threshold.

In a further modification of the method it is provided that
    (d) the reflector assembly is moved,
    (e) the inertia of the reflector assembly is determined during such movement, and
    (f) the reflector assembly is moved into a position where the forces acting on the reflector assembly are a minimum if the inertia exceeds a selected threshold.

Using an analogue or digital set of rules, it can be further provided that the position of the sun is determined with the acceleration sensor and photo sensors and the exact time of the day and the exact day of the year is calculated.

Using a temperature control it is advantageous if each solar collector is pre-adjusted by the manufacturer and/or manually adjusted at the point of use to a well-defined target temperature which may not be exceeded at the inlet and outlet of the pipe.

Using a radio receiver in the control means the reflector assembly can prophylactically externally be transferred into an emergency operation mode upon exceeding too high vibrations or too high rotational forces where the solar collector is downwardly directed with the cover.

An acceleration sensor can be used in the control unit for measuring vibrations in particular caused by wind while the reflector assembly is rotated upon exceeding too high vibrations to a position where such vibrations are minimized or compensated.

Using a radio sender in the control means, it is enabled that all available data of the reflector assembly can be emitted at any time.

Further modifications of the invention are subject matter of the sub-claims. A preferred embodiment is described below in greater detail with reference to the accompanying drawings.

DETAILED DESCRIPTION OF THE INVENTION

Figure 1:
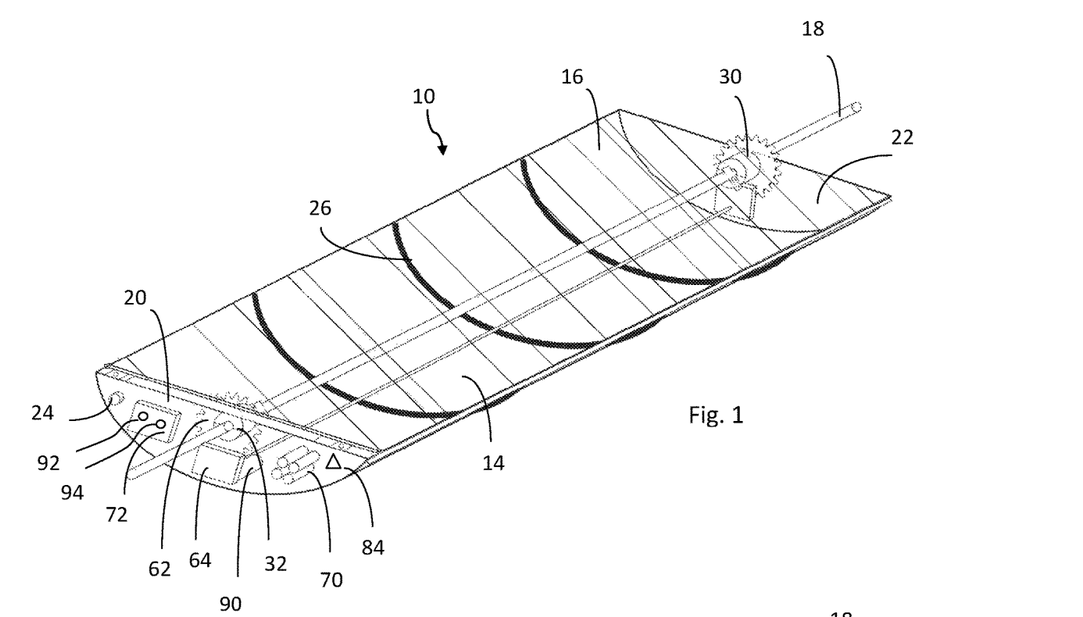
FIG. 1 is a perspective view of the installed solar collector.

FIG. 1 shows a solar collector generally designated with numeral 10. The solar collector 10 is a portion of a solar power station consisting of many of such solar collectors 10. A reflector assembly designated with numeral 12 is provided with a reflector 14 coated with aluminum on its inside and a plane cover 16 of transparent glass. The cover 16 is coated with an anti-reflex layer and a non-stick coating. The reflector 14 is curved and has a parabolic cross section. Parallel solar radiation which is incident on the cover 16 under a perpendicular angle will be focused in one focal line. In such a way the entire incident radiation is focused in one line. A pipe 18 is installed in the range of the focal line. The pipe 18 of the present embodiment consists of copper which is a good heat conductor and in the present embodiment water flows through the pipe. A controllable circulation pump (not shown) is provided for this purpose. The solar radiation is absorbed at the pipe 18 which forms an absorber and the thermal energy is transferred. The thermal energy is flowed away by the water flowing through the pipe 18 for further use in common ways. In areas where there is a risk of freezing a fluid is used which will not freeze even at lower temperatures.

Figure 2:
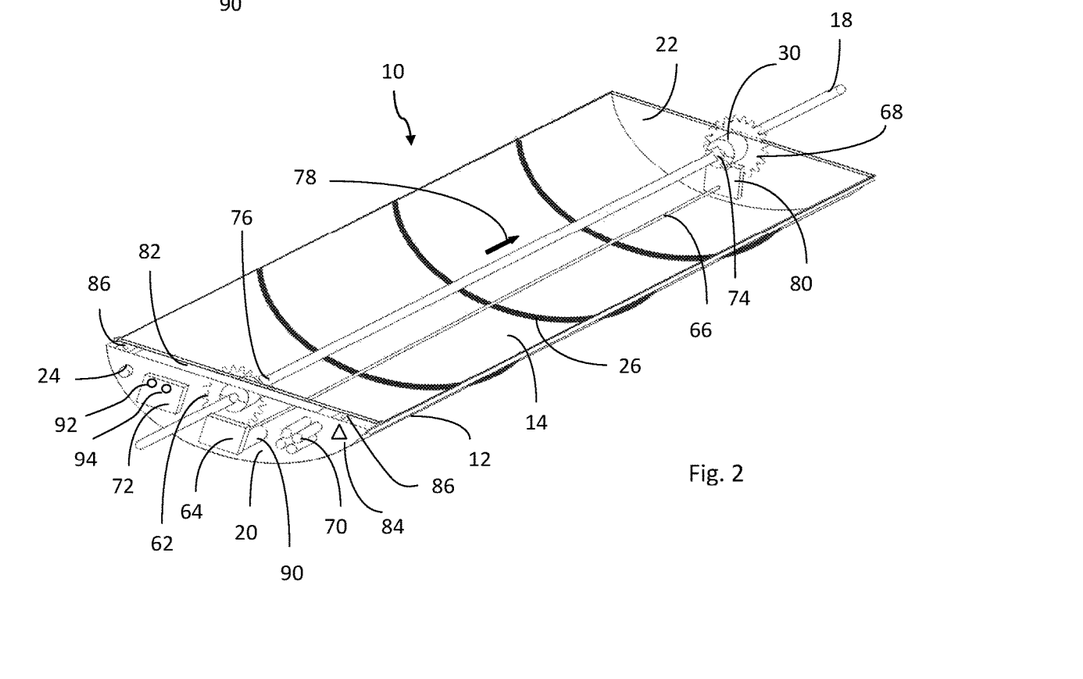
FIG. 2 shows the solar collector of FIG. 1 without cover.

The reflector is provided with plates 20 and 22 at its end faces. The reflector assembly 12 forms a closed space with the reflector 14, plates 20, 22 and cover 16. The closed space surrounded by the reflector assembly 12 is sealed against the environment with suitable sealings (not shown). A hydrophobic diaphragm 24 is inserted into an opening in the plate 20 at the end face of the reflector assembly, such as by OXYPHEN AG, Giessereistrasse 1, 8620 Wetzikon in Switzerland. The diaphragm 24 is transparent for small molecules, in particular for oxygen molecules O2 and nitrogen molecules N2. Larger water molecules H2O are allowed to pass only towards the outside in the direction of the environment. Therefore, no water can enter the inside of the reflector assembly 12. A pressure compensation can be achieved by the hydrophobic diaphragm 24. Sealings and components of the reflector assembly 12 are not stressed. A vacuum is not necessary. Accordingly, the glass cover 16 may be thin. In addition to the hydrophobic diaphragm 24 hygrophilous material in the form of salt is used in the inside. The salt binds all water which might be present in the inside.

The dried air in the inside of the reflector assembly 12 allows for no water condensation at the cover or plate whereby the radiation is passed unaffected to the pipe independently of the weather—and temperature conditions.

The solar collector of the present embodiment is about 2 m long. The reflector 14 is thin in order to avoid excessive weight which would render transport and installation difficult. In order to maintain the stability of the shape of the reflector 14 the reflector is held in a frame of bent ribs 26 and longitudinal reinforcements 28. The longitudinal reinforcements 28 are T-shaped and are connected to the ribs 26 and the plates 20, 22 of the reflector.

Figure 3:
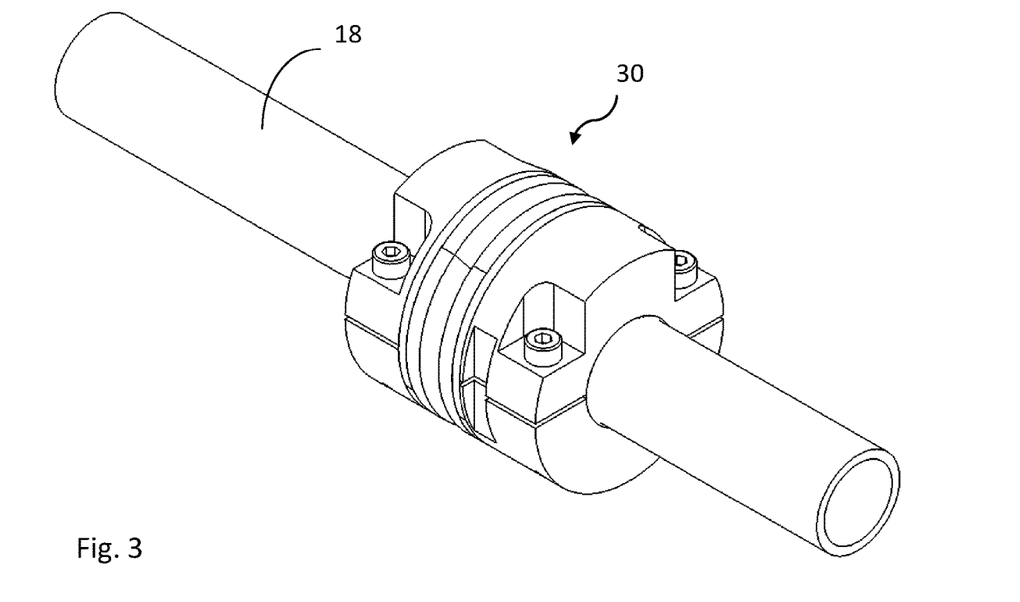
FIG. 3 is a perspective view of installed clamping elements for fixing the solar collector to a pipe in greater detail.
Figure 4:
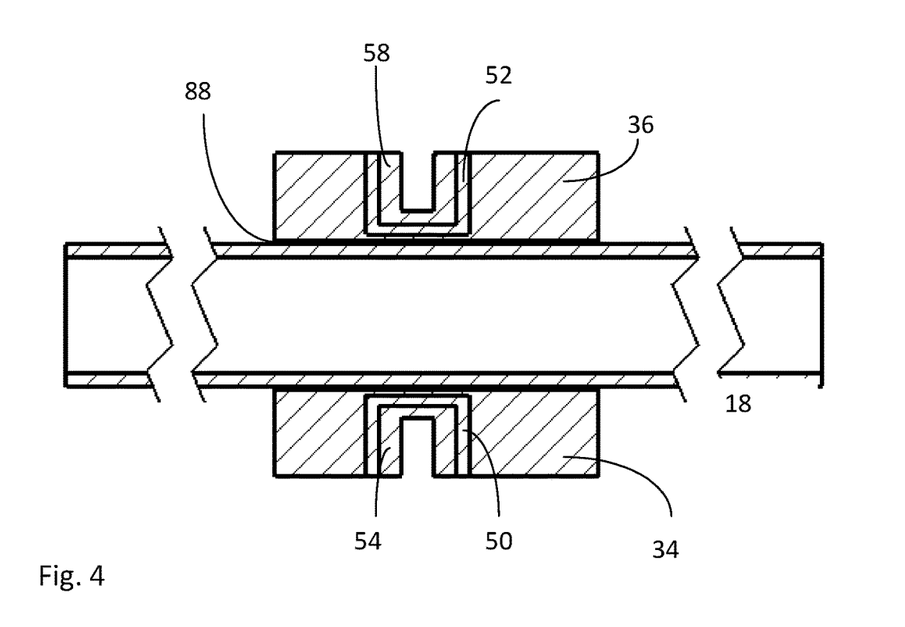
FIG. 4 is a cross sectional view of the assembly shown in FIG. 3.
Figure 5:
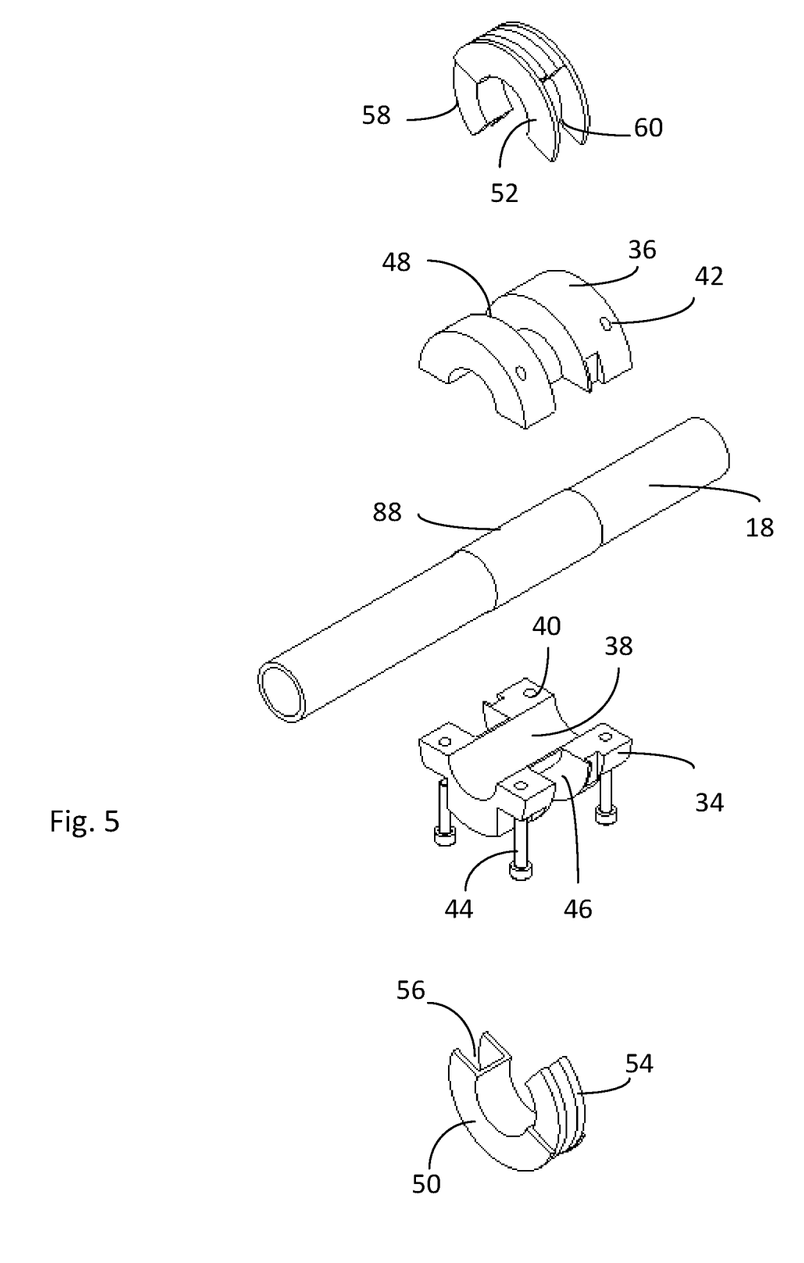
FIG. 5 is an exploded view of the assembly in FIG. 3.
Figure 6:
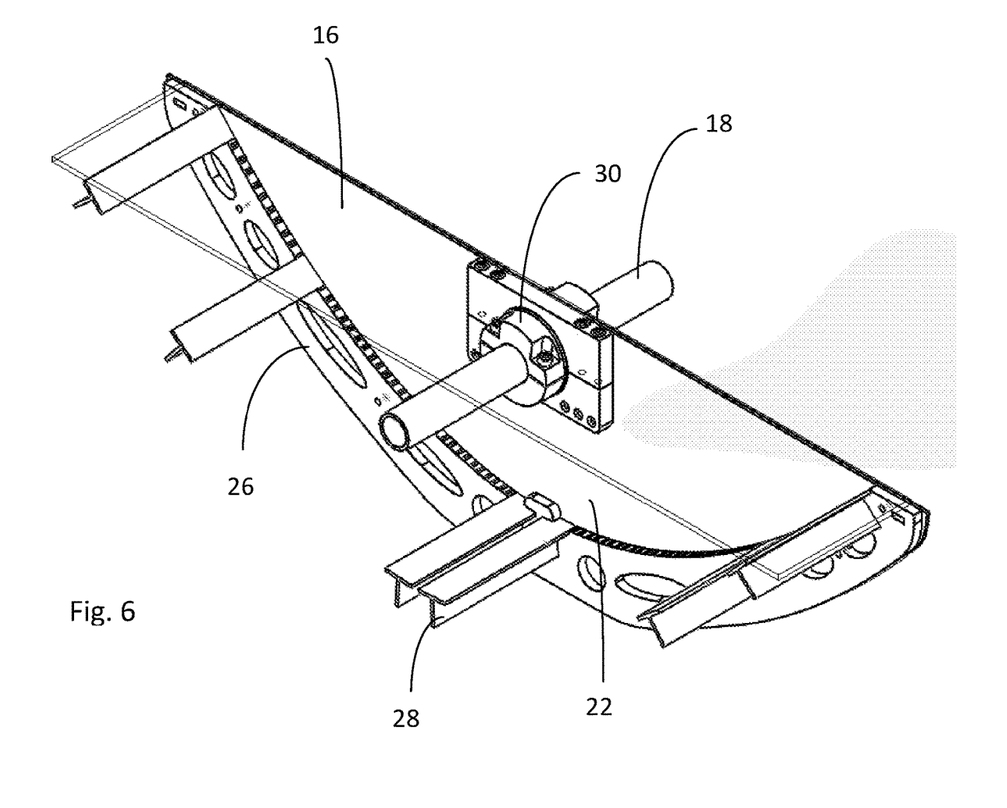
FIG. 6 is a perspective view of the connection of the slide bearing to the reflector assembly.

The reflector assembly 12 is rotatably connected to the pipe 18. For this purpose, two slide bearings 30 and 32 are provided which are shown in FIGS. 3 to 6 in greater detail. FIG. 3 is a perspective view and shows a section of the pipe 18 with installed slide bearing 30. The slide bearing 30 comprises a lower clamping element 34 and an upper clamping element 36. This can be well seen in the exploded view in FIG. 5. The clamping elements 34 and 36 are half-shell shaped. They form a U-shaped trough 38 which abuts the pipe 18 when it is installed. A sealing 88 is provided between the clamping elements 34 and the pipe. The clamping element 34 is provided with four bore holes 40 at each corner. Screws 44 extend through the bore holes 40 which are screwed into threaded bore holes 42 in the upper clamping element 36. In such a way the clamping elements 34 and 36 are tightly connected to the pipe 18 without the need to open it.

The clamping elements 34 and 36 each are provided with a wide annular groove 46 and 48. A first bearing element 50 is accommodated in the annular groove 46 of the slide bearing 30. A second, complementary bearing element 52 of the slide bearing 30 is accommodated in the annular groove 48. An inner portion 54 of the bearing element 50 is movably guided in a receptacle 56. An inner portion 58 of the bearing element 52 is movably guided in a receptacle 60. The slide bearing 32 is identical to the slide bearing 30. In such a way the plates 22 and 20 of the reflector assembly 12 are rotatably guided about the longitudinal axis of the pipe 18.

A cogwheel 62 is fixed to the slide bearing 32. The cogwheel 62 is moved by a gear 64. Such gear transmits the driving power of a motor 90 to the slide bearing 32 present above. Furthermore, a shaft 66 is driven by the motor 90. The shaft 66 extends along the entire length of the solar collector 10. At the opposite end the shaft 66 ends in a gear 80 engaging in a cogwheel 68. The cogwheel 68 is connected to the slide bearing 30. In such a way the power of the motor 90 is exerted on the slide bearing 30 as well as on the slide bearing 32. The motor 90 is supplied with energy by solar cells 82. Additionally, accumulators 70 are provided which ensure the energy supply even in the night or with unfavorable light conditions.

By activating the motor 90 the movement of the sun is tracked by the reflector assembly 12. An acceleration sensor 84, such as, for example, LIS3DH by STMicroelectronics, is fixed to the plate 20. The acceleration sensor provides data relating to the position of the reflector assembly to a control unit 72. The control unit calculates the position of the sun from the actual time, the date and the geo-position and controls the motor 90 in such a way that the reflector assembly 12 assumes an optimum position where the entire solar radiation is focused in one focal line. The use of an acceleration sensor has the advantage over an optical tracking that the optimum position is found even if the light conditions, such as with clouded sky, do not allow for an unambiguous determination of the solar proceeding. The detection of the light intensity serves to unambiguously determine the solar proceeding over the day and the year. Two photo detectors or photo sensors 86 are used for this purpose.

Furthermore, the acceleration sensor 84 detects if and how much vibrations occur. With strong vibrations, which, for example, exceed 63 Hertz, the assembly is moved into a position where the vibrations are minimized.

Furthermore, the current necessary for the rotational movement during the movement is detected. A large current is necessary for a movement to overcome a high wind resistance (storm). If the wind resistance exceeds a threshold the assembly is protected.

For this purpose the assembly is moved into a position where the smallest current is required for a rotational movement by the step motor. In other words: the assembly is moved into a position with the smallest wind resistance. In such a way the assembly is protected against damages by storm.

In order to avoid dirt the reflector assembly 12 is continuously moved forward during the night even after sunset until the glass plate is at the bottom side. Only upon sunrise the reflector assembly 12 is moved back into its operating position.

Temperature sensors 74 and 76 are fixed to the clamping elements of the slide bearings 30 and 32. The temperature sensors 74 and 76 detect the temperature at the pipe 18. For example, the outlet temperature is detected with temperature sensor 74 and the inlet temperature is detected with the temperature sensor 76 if the fluid flows in the direction of arrow 78 through the pipe 18. If one or both temperatures exceed a maximum threshold, such as, for example, 300° C. the reflector assembly 12 is moved whereby less solar radiation is passed to the pipe. Additionally, it can be provided that the pumping power of the circulation pump is increased. Thereby, overheating and damaging of components is avoided.

The temperature sensor 74 is provided with a converter. The converter converts the temperature signal to an optical laser signal. The laser signal is emitted parallel to the pipe axis to a detector (not shown) on the opposite side of the reflector assembly. The detector detects the optical signal, converts the signal to an electric signal and a sender transmits it wireless to the control unit 72.

The entire reflector assembly 12 is pre-adjusted during manufacturing. Only the clamping elements 34 and 36 surrounding a mock pipe installed during manufacturing must be released from each other for installation at the point of use. At the point of installation of the solar collector the above components are again mounted by screwing. Further installation works or adjustment works are not necessary. Thereby, the installation can also be carried out by untrained persons. Qualified personnel is necessary only in the factory and does not need to travel to worldwide distributed installation locations. The assembly can, therefore, be particularly economically produced and installed. Due to the use of suitable sensors overheating and storm damages are avoided. Therefore, the assembly has a particularly long life time.

The solar collector was described above in great detail with indications regarding diameters, component designations, fixing methods, sensors and materials. Such indications only serve to illustrate the invention and shall not limit the scope of the invention. Further modifications are possible without deviating from the general idea of the invention the scope of which is defined exclusively by the wording of the claims.

What is claimed is:

1. A solar collector assembly exposed to solar radiation having solar energy comprising:
   a pipe exposed to said solar energy and adapted to accommodate a fluid flow in such a way that said solar energy is transferred to said fluid, a heat pipe or any other energy guiding system or absorber;
   a reflector assembly with a curved reflector for focusing said solar radiation in the range of said pipe; and
   an actuator in the form of a motor for moving said reflector assembly in a way that said solar radiation is reflected in the direction of said pipe, and wherein fixing means are provided for releasably fixing said reflector assembly to said pipe, and said actuator is fixed to said reflector assembly wherein said actuator, a control means and a power supply form a module with said reflector assembly which can be fully assembled by a manufacturer and mounted in one piece at said pipe.

2. The assembly of claim 1 and wherein said fixing means for releasably fixing said reflector assembly to said pipe comprise:
   a first clamping element; and
   a second clamping element for connecting to said first clamping element, wherein said reflector assembly is rotatably mounted.

3. The assembly of claim 2, and wherein said first and said second clamping element are semicircular and each has an annular groove for receiving a bearing element for rotatably mounting said reflector assembly about said pipe.

4. The assembly of claim 1 and wherein said reflector assembly has two ends and fixing means for releasably fixing said reflector assembly to said pipe are provided at each of said ends, such fixing means being connected by a shaft in such a way that the force exerted by said actuator on said reflector assembly is partly transferred to the opposite end of said reflector assembly by said shaft.

5. The assembly of claim 1 and wherein said reflector assembly has two ends with an end portion and wherein control means are provided at an end portion of said reflector assembly for controlling said actuator and solar cells for the energy supply for said actuator and/or said control means are provided at the end portion of said reflector assembly.

6. The assembly of claim 2 and wherein said reflector assembly has two ends and a temperature sensor is fixed to said clamping elements for sensing the temperature at the pipe at each of said ends of said reflector assembly.

7. The assembly of claim 6, further comprising
   (a) a converter provided at a first end of said reflector assembly said converter having a light source for converting temperature data of a temperature sensor at this end into an optical signal,
   (b) a detector provided at the opposite, second end of said reflector assembly for receiving such optical signal, and
   (c) a converter with a sender for transmitting said temperature data of said first and second temperature sensor to a control means.

8. The assembly of claim 1 and wherein said reflector of said reflector assembly has a curved profile line and said reflector assembly is provided with one or more reinforcements extending parallel and/or lateral to said pipe wherein said lateral extending reinforcements are ribs curved in accordance with said profile line of said reflector and wherein longitudinal reinforcements are sectional strips with T-shaped or H-shaped cross sections.

9. The assembly of claim 1 and wherein a control unit and an acceleration sensor are provided at said reflector assembly and wherein said acceleration sensor provides data relating to the position of said reflector assembly to said control unit and wherein said control unit is adapted to calculate the position of the sun from said data and controls said motor in such a way that said reflector assembly assumes an optimum position where the entire solar radiation is focused in one focal line.

10. The assembly of claim 1 and wherein said reflector assembly surrounds a closed space with said reflector and a transparent cover and said space is provided with a diaphragm bordering to the outside, said diaphragm adapted to be permeable for nitrogen molecules, oxygen molecules and other small gas molecules and impermeable for water molecules.

11. The assembly of claim 10 and wherein a hygroscopic material is enclosed in said closed space.

* * * * *